(12) United States Patent
Baba et al.

(10) Patent No.: US 6,653,031 B2
(45) Date of Patent: Nov. 25, 2003

(54) PHOTOSENSITIVE COLORING COMPOSITION, AND COLOR FILTER AND LIQUID CRYSTAL DISPLAY PANEL USING THE SAME

(75) Inventors: Koji Baba, Toyonaka (JP); Takao Mori, Sennan (JP); Kiyoharu Nakatsuka, Suita (JP)

(73) Assignee: Sumitomo Chemical Company, Limited, Osaka (JP)

( * ) Notice: Subject to any disclaimer, the term of this patent is extended or adjusted under 35 U.S.C. 154(b) by 261 days.

(21) Appl. No.: 09/923,345

(22) Filed: Aug. 8, 2001

(65) Prior Publication Data

US 2002/0018943 A1 Feb. 14, 2002

(30) Foreign Application Priority Data

Aug. 10, 2000 (JP) .......................... 2000-242300
Sep. 22, 2000 (JP) .......................... 2000-288258

(51) Int. Cl.⁷ ........................... G03F 7/004; G02B 5/20; G02F 1/1335
(52) U.S. Cl. .................... 430/7; 430/270.1; 349/106; 106/480; 106/494; 106/496
(58) Field of Search ............... 430/7, 270.1, 281.1; 349/106; 106/480, 494, 496

(56) References Cited

U.S. PATENT DOCUMENTS 6,013,415 A * 1/2000 Sakurai et al. ........... 430/281.1

FOREIGN PATENT DOCUMENTS

JP 10-20485 1/1998
JP 11-209631 A * 8/1999

* cited by examiner

*Primary Examiner*—John A. McPherson
(74) *Attorney, Agent, or Firm*—Birch, Stewart, Kolasch & Birch, LLP

(57) ABSTRACT

A photosensitive coloring composition comprising C.I. pigment yellow 150 which yields an extract in an amount of 1% by weight or less when subjected to extraction with tetrahydrofuran, other pigments, a solvent, a (meth)acrylic resin, a polyfunctional monomer, and a photopolymerization initiator. The photosensitive coloring composition is excellent in fluidity, anti-agglomeration property, anti-crystallization property, coloring power and the like, and, with the photosensitive coloring composition, images having superior sharpness when developed with an aqueous alkaline solution can be formed, and color filters having high uniformity, low surface coarseness and high coloring power, as well as liquid crystal display panels can be obtained steadily.

9 Claims, No Drawings

PHOTOSENSITIVE COLORING COMPOSITION, AND COLOR FILTER AND LIQUID CRYSTAL DISPLAY PANEL USING THE SAME

BACKGROUND OF THE INVENTION

The present invention relates to photosensitive coloring compositions. More specifically, it relates to a photosensitive coloring composition comprising a specific pigment, namely C.I. pigment yellow 150, other pigments, a (meth) acrylic resin, a solvent, a polyfunctional monomer, and a photopolymerization initiator.

Photosensitive coloring compositions comprising pigments as coloring agents are useful as colored image forming materials and are utilized in various technical fields such as liquid crystal color displays.

A colored image is formed by applying such a photosensitive coloring composition onto a substrate, drying the solvent comprised therein to form a colored layer and then subjecting the colored layer to exposure to light and development. The colored layer needs to be soluble in an aqueous alkaline solution because the development process uses such an aqueous alkaline solution as a developer. For this reason, a binder resin having an acidic group is used in the photosensitive coloring composition.

For instance, a photosensitive coloring composition comprising an acrylic resin having polymerization units derived from benzyl (meth)acrylate (a) and (meth)acrylic acid (B) wherein the molar ratios of respective monomers are (a) 50 to 90 and (B) 10 to 50 as a binder resin, and C.I. pigment yellow 139 or the like as a coloring agent, has been proposed (JP-A-10-20485).

In the case where a photosensitive coloring composition containing C.I. pigment yellow 150 as a coloring agent is used, an image with superior sharpness does not always result. Hence, a problem arises that a color filter with high uniformity, low surface coarseness and high coloring power is not always obtained.

As a result of repeated intensive study of C.I. pigment yellow 150 pursued by the inventors of the present invention in view of the foregoing circumstances, it has been discovered that use of a photosensitive coloring composition containing a specific C.I. pigment yellow 150 makes it possible to form images having superior sharpness and to steadily provide color filters having high uniformity, low surface coarseness and high coloring power. The inventors of the present invention have completed the present invention by having various additional considerations of this discovery.

SUMMARY OF THE INVENTION

Accordingly, the present invention provides a practically excellent photosensitive coloring composition comprising C.I. pigment yellow 150 which yields an extract in an amount of 1% by weight or less when subjected to extraction with tetrahydrofuran, other pigments, a solvent, a (meth) acrylic resin, a polyfunctional monomer, and a photopolymerization initiator.

DETAILED DESCRIPTION OF THE PREFERRED EMBODIMENTS

The photosensitive coloring composition is characterized that a specific C.I. pigment yellow 150 is used as a coloring agent. The specific C.I. pigment yellow 150 yields an extract in an amount of 1% by weight or less when subjected to extraction with tetrahydrofuran (hereinafter abbreviated as "THF"). Preferably, the specific C.I. pigment yellow 150 yields an extract in an amount of 0.8% by weight or less when subjected to extraction with THF. As used herein, the extract yielded by extraction with THF means an extract resulting when C.I. pigment yellow 150 is subjected to extraction with THF having a weight 20 to 30 times as large as the weight of the C.I. pigment yellow 150.

The other pigment used in the present invention is not particularly limited. Examples thereof include:

yellow pigments such as C.I. pigment yellow 20, C.I. pigment yellow 24, C.I. pigment yellow 42, C.I. pigment yellow 43, C.I. pigment yellow 83, C.I. pigment yellow 86, C.I. pigment yellow 93, C.I. pigment yellow 109, C.I. pigment yellow 110, C.I. pigment yellow 117, C.I. pigment yellow 125, C.I. pigment yellow 137, C.I. pigment yellow 138, C.I. pigment yellow 139, C.I. pigment yellow 155, C.I. pigment yellow 157, C.I. pigment yellow 185, C.I. pigment yellow 147, C.I. pigment yellow 148, C.I. pigment yellow 153, C.I. pigment yellow 154, C.I. pigment yellow 166, and C.I. pigment yellow 168;

Orange pigments such as C.I. pigment orange 36, C.I. pigment orange 41, C.I. pigment orange 43, C.I. pigment orange 51, C.I. pigment orange 55, C.I. pigment orange 59, C.I. pigment orange 61, C.I. pigment orange 71, and C.I. pigment orange 73;

red pigments such as C.I. pigment red 9, C.I. pigment red 88, C.I. pigment red 97, C.I. pigment red 101, C.I. pigment red 101:1, C.I. pigment red 122, C.I. pigment red 123, C.I. pigment red 144, C.I. pigment red 149, C.I. pigment red 166, C.I. pigment red 168, C.I. pigment red 175, C.I. pigment red 176, C.I. pigment red 177, C.I. pigment red 179, C.I. pigment red 180, C.I. pigment red 185, C.I. pigment red 190, C.I. pigment red 192, C.I. pigment red 209, C.I. pigment red 215, C.I. pigment red 216, C.I. pigment red 217, C.I. pigment red 220, C.I. pigment red 223, C.I. pigment red 224, C.I. pigment red 240, C.I. pigment red 242, C.I. pigment red 254, C.I. pigment red 257, C.I. pigment red 260, C.I. pigment red 264, C.I. pigment red 270, C.I. pigment red 271, C.I. pigment red 272, and C.I. pigment red 48:1;

violet pigments such as C.I. pigment violet 15, C.I. pigment violet 19, C.I. pigment violet 23, C.I. pigment violet 29, C.I. pigment violet 30, C.I. pigment violet 37, C.I. pigment violet 40, and C.I. pigment violet 50;

blue pigments such as C.I. pigment blue 15, C.I. pigment blue 15:2, C.I. pigment blue 15:4. C.I. pigment blue 15:6, C.I. pigment blue 16, C.I. pigment blue 22, C.I. pigment blue 27, C.I. pigment blue 29, C.I. pigment blue 60, and C.I. pigment blue 64; and green pigments such as C.I. pigment green 7 and C.I. pigment green 36.

The amount of the extract extracted with THF from each of the other pigments is preferably 1% by weight or less, more preferably 0.8% by weight or less.

The extract resulting when the C.I. pigment yellow 150 is subjected to extraction with THF comprises a higher fatty acid having about 12 to 20 carbon atoms, or a salt thereof, an ester thereof with an alcohol having about 1 to 20 carbon atoms, and the like. The amount of these substances is preferably 1% by weight or less more preferably 0.8% by weight or less.

The total content of the C.I. pigment yellow 150 and other pigments in the photosensitive coloring composition is usually 5% to 80% by weight, preferably 10% to 70% by weight relative to the total amount of solid contents.

As the (meth)acrylic resin used as a binder in the present invention, one having polymerization units derived from benzyl (meth)acrylate (a) and (meth)acrylic acid (B) is usually used. The molar ratio (a):(B) of the monomers is usually 50 to 90:10 to 50, preferably 60 to 65:15 to 40. If the blending ratio of (B) is more than 50, the resulting dispersion exhibits increased viscosity and hence has an inferior dispersion property, tending to form an image having an image-forming portion having lowered resistance against an alkaline developer. If it is less than 10, the resulting dispersion also exhibits an inferior dispersion property, tending to form an image having a non image-forming portion having poor solubility with respect to the alkaline developer.

The polystyrene-converted molecular weight of such a resin is preferably 5,000 to 300,000. If its molecular weight is more than 300,000, the resulting dispersion exhibits increased viscosity and hence tends to have a difficulty in uniform application thereof. If it is less than 5,000, the resulting dispersion exhibits too decreased viscosity and hence also tends to have a difficulty in uniform application thereof.

In preparing the acrylic resin of the composition described above, other additional monomers can be used. Examples of such monomers include phenyl acrylate, acrylonitrile, vinyl acetate, N-vinylpyrrolidone, 2-hydroxyethyl methacrylate, 2-hydroxyethyl acrylate, 2-ethylhexyl acrylate, nonylphenylcarbitol acrylate, 2-hydroxy-3-phenoxypropyl acrylate, methyl methacrylate, styrene, and maleic anhydride.

The weight ratio of acrylic resin/pigment in the photosensitive coloring composition of the present invention is usually about 0.1 to 16, preferably about 0.25 to 7.

Examples of the solvent comprised in the photosensitive coloring composition of the present invention include alkyleneglycol monoalkylethers such as ethylene glycol monomethyl ether, ethylene glycol monoethyl ether, propylene glycol monomethyl ether, propylene glycol monoethyl ether, diethylene glycol monomethyl ether and diethylene glycol monoethyl ether; polyalkylene glycolmonoalkylether; acetates of the above ether; acetates such as ethyl acetate, n-propyl acetate, i-propyl acetate, n-butyl acetate and i-butyl acetate; aromatic hydrocarbons such as benzene, toluene and xylene; ketones such as methyl ethyl ketone, acetone, methyl isobutyl ketone and cyclohexanone; alcohols such as ethanol, propanol, butanol, hexanol, cyclohexanol, ethylene glycol, diethyleneglycol and glycerin; and alicyclic ethers such as tetrahydrofuran and dioxane.

Among them, alkyleneglycol monoalkylethers, acetates thereof, acetates and methylethyl ketone are preferred. The solvent is usually used in an amount so that the solid content of the photosensitive coloring composition is 3–70% by weight, preferably 5–50% by weight.

Examples of polyfunctional monomers for use in the present invention include (meth)acrylic ester, urethane (meth)acrylate, (meth)acrylic amide, allyl compound, and vinyl ester, as taught In JP-A-60-258539. Among them, (meth)acrylic ester is preferably used. The amount of the polyfunctional monomer is preferably 10% to 60% by weight relative to the amount of other solid contents in the pigment-dispersed photosensitive composition.

The photopolymerization initiator used in the present invention may be any photopolymerization initiator commonly used in the art. Examples of such photopolymerization initiators include acetophenone-type, benzoin-type, thioxanthone-type, s-triazine-type, and others. Specific examples of acetophenone-type initiators include oligomers such as diethoxyacetophenone, 2-hydroxy-2-methyl-1-phenylpropane-1-one, benzyldimethylketal, 2-hydroxy-1-[4-(2-hydroxyethoxy)phenyl]-2-methylpropane-1-one, 1-hydroxycyclohexyl phenyl ketone, 2-methyl-1-(4-methylthiophenyl)-2-morpholinopropane-1-one, 2-benzyl-2-dimethylamino-1-(4-morpholinophenyl)butane-1-one, 2-hydroxy-2-methyl-1-[4-(1-methylvinyl)phenyl] propane-1-one.

Specific examples of benzoin-type initiators include benzoin, benzoin methyl ether, benzoin ethyl ether, benzoin isopropyl ether, and benzoin isobutyl ether.

Specific examples of benzophenone-type initiators include benzophenone, methyl o-benzoyl benzoate, 4-phenylbenzophenone, 4-benzoyl-4'-methyldiphenyl sulfide, 3,3',4,4'-tetra(tert-butyl peroxycarbonyl) benzophenone, and 2,4,6-trimethylbenzophenone.

Specific examples of thioxanthone-type initiators include 2-isopropyl thioxanthone, 4-isopropyl thioxanthone, 2,4-diethyl thioxanthone, 2,4-dichlorothioxanthone, and 1-chloro-4-propoxy thioxanthone.

Specific examples of s-triazine-type include 2,4-bis(trichloromethyl)-6-(4-methoxyphenyl)-1.3,5-triazine, 2,4-bis(trichloromethyl)-6-(4-methoxynaphthyl)-1.3,5-triazine, 2,4-bis(trichloromethyl)-6-piperonyl-1.3,5-triazine, 2,4-bis(trichloromethyl)-6-(4-methoxystyryl)-1.3,5-triazine, 2,4-bis(trichloromethyl)-6-[2-(5-methylfuran-2-yl)ethenyl]-1.3,5-triazine, 2,4-bis(trichloromethyl)-6-[2-(furan-2-yl)ethenyl]-1.3,5-triazine, 2,4-bis(trichloromethyl)-6-(4-diethylamino-2-methylstyryl)-1.3,5-triazine, and 2,4-bis(trichloromethyl)-6-(3,4-dimethoxystyryl)-1.3.5-triazine, Specific examples of other initiators include 2,4,6-trimethylbenzoyl diphenylphosphine oxide, 2,2'-bis(o-chlorophenyl)-4,4',5,5'-tetraphenyl-1,2'-biimi dazole, 10-butyl-2-chloroacridone, 2-ethylanthraquinone, benzyl, 9,10-phenanthrenequinone, camphorquinone, methyl phenylglyoxylate and titanocene compounds.

These photopolymerization initiators may be used either alone or in combination of two or more of them.

The content of the photopolymerization initiator in the photosensitive coloring composition is 0.3% to 100% by weight, preferably 0.5% to 60% by weight relative to the content of the polyfunctional monomer.

The photosensitive coloring composition of the present invention preferably contains a dispersant. Examples of such dispersants include pigment derivatives each obtained by introducing a substituent, such as sulfone group, sulfonamide group, aminomethyl group or methylphthalimide group, as a side chain in an organic pigment forming a skeleton; high-molecular dispersants; and low-molecular dispersants of alkanolamine, carboxylic acid amide, urea or amide type. These dispersants may be used either alone or as mixtures.

Though the alkanolamine-type dispersant may be a compound having one nitrogen atom in a molecule thereof, alkanolamine having two or more nitrogen atoms in a molecule thereof is preferred. These alkanolamines may be used either alone or in combination. In the case where the alkanolamine having two or more nitrogen atoms in a molecule thereof is combined with the alkanolamine having one nitrogen atom in a molecule thereof, the proportion of the former in a mixture of the two is preferably not less than 5%, more preferably not less than 50%. In the case where the alkanolamine-type dispersant is combined with other dispersants, the proportion of the alkanolamine-type dispersant is 5 parts by weight or more, preferably 50 parts by weight or more, based on 100 parts be weight of the total dispersant.

The proportion of dispersants in a pigment-dispersed composition is 0.1 to 200 parts by weight, preferably 1 to 50 parts by weight, based on 100 parts by weight of the pigment used.

The photosensitive coloring composition of the present invention is usually obtained by preparing a pigment-dispersed composition consisting of the pigments, dispersant, solvent and the like and then mixing the (meth) acrylic resin, polyfunctional monomer, photopolymerization initiator and the like therewith.

The pigment in the pigment-dispersed composition can be favorably dispersed by the use of such a dispersing machine as a kneader, roll mill, ball mill, attritor, supermill, dissolver, homomixer, sand mill or bead mill. A particularly preferable dispersing process includes subjecting a mixture of the pigment, dispersant and solvent to rough dispersion with use of a dispersing machine adapted for high-viscosity liquids such as a kneader or roll mill, adding the solvent or the like to the resulting dispersion to adjust the viscosity of the dispersion to a suitable degree for the dispersing machine to be used, and subjecting the dispersion to fine dispersion with use of a dispersing machine using media such as beads. The lower the temperature of the dispersion in the dispersing machine using such media, the more preferable. Specifically, the dispersion is preferably cooled to 30° C. or lower.

Subsequently, the pigment-dispersed composition thus prepared is mixed with the (meth)acrylic resin, polyfunctional monomer, photopolymerization initiator and the like to obtain the photosensitive coloring composition of the present invention.

A process for forming a color filter using the photosensitive coloring composition thus obtained comprises at least the following steps (1) and (2):

(1) forming a photosensitive layer containing the pigments dispersed therein by applying the photosensitive coloring composition onto a substrate and drying it or by applying the photosensitive coloring composition onto a provisional support member, drying it to form a layer, and transferring the layer to a substrate; and (2) subjecting the photosensitive composition layer containing the pigments dispersed therein to exposure to radiation and development to form a pattern.

In forming a color filter for use in a liquid crystal display panel or the like, the steps (1) and (2) are repeated and the pattern of the second color and a succeeding color, if any, is combined with the pattern of the first color to form the color filter. Methods of forming color filters using the transfer process as described in, for example, JP-A-4-208940, 5-72724, 5-80503 and 5-173320 are also applicable.

Transparent materials such as a glass plate and a transparent plastic plate are preferably used as the substrate. To improve the adherence between the substrate and the photosensitive coloring composition, a silane coupling agent selected from various commercially-available ones may be added to the composition, or such a silane coupling agent may be caused to act on the substrate followed by applying the composition onto the substrate. Useful means for applying the photosensitive coloring composition onto the substrate include a spin coater, roll coater, bar coater, curtain coater, and slit and spin coater.

Examples of suitable developers for use in the present invention include aqueous solutions of hydroxides, carbonates and bicarbonates of alkali metals or alkali earth metals, ammonia water, and an aqueous solution of quaternary ammonium salt.

EXAMPLES

Hereinafter, the present invention will be more specifically described by way of examples, which, however, should not be construed to limit the present invention. In the following examples, the "part (s)" used to represent the content of any component or the amount of any material used is on a weight basis unless otherwise specifically noted. The amount of an extract resulting from extraction with THF was determined using a value obtained by accurately weighing about 1.2 g of a pigment, putting it into a centrifuge tube, adding about 30 ml of THF to the pigment, subjecting the resulting mixture to extraction for 30 min using an ultrasonic cleaner, separating the resulting supernatant liquor, distilling low-boiling-point contents off under reduced pressure, followed by drying under reduced pressure, and weighing the resulting residue.

Example 1

(1) 5.00 parts of a C.I. pigment yellow 150 that yields an extract in an amount of 0.5% when subjected to extraction with THF, 1.50 parts of a dispersant (Solsperse 32000 produced by AVECIA CO.) and 9.45 parts of propylene glycol monomethyl ether acetate were pre-mixed together for one hour using DISPER at 500 rpm, then adding 61 parts of zirconia beads to the resulting premix, and conducting dispersion for five hours with a high-speed stirring mill. To the resulting dispersion was added a mixture comprising 1.50 parts of a binder resin (benzyl methacrylate/methacrylic acid copolymer: composition by weight ratio=80/20, and weight-average molecular weight=25,400) and 20.95 parts of propylene glycol monomethyl ether acetate, and the resulting mixture was subjected to mixing to give a pigment dispersion.

(2) 38.4 parts of the pigment dispersion thus obtained was mixed with a mixture comprising 4.42 parts of the same binder as above, 5.72 parts of an acrylic monomer (dipentaerythritol hexaacrylate: "KAYARAD DPHA" produced by NIPPON KAYAKU KABUSHIKI KAISHA), 1.37 parts of Irgacure-907 (produced by Ciba Specialty Chemicals CO.), 0.69 parts of KAYACURE DETX-S (produced by NIPPON KAYAKU KABUSHIKI KAISHA), and 49.6 parts of propylene glycol monomethyl ether acetate, to prepare a photosensitive coloring composition. The composition thus prepared exhibited superior fluidity. Even after the composition had been allowed to stand for 30 days, the composition still exhibited superior fluidity.

Example 2

A photosensitive coloring composition was prepared in the same manner as in Example 1 except that a C.I. pigment yellow 150 that yields an extract in an amount of 0.7% when subjected to extraction with THF was used instead of the C.I. pigment yellow 150 used in Example 1. The composition thus prepared exhibited superior fluidity. Even after the composition had been allowed to stand for 30 days, the composition still exhibited superior fluidity.

Comparative Example 1

A photosensitive coloring composition was prepared in the same manner as in Example 1 except that a C.I. pigment yellow 150 that yields an extract In an amount of 10% when subjected to extraction with THF was used instead of the C.I. pigment yellow 150 used in Example 1. The composition thus prepared exhibited superior fluidity. Even after the composition had been allowed to stand for 30 days, the composition still exhibited superior fluidity.

Examples 3 and 4

A #7059 glass substrate (produced by CONING JAPAN CO.) was coated with each of the photosensitive coloring compositions obtained in Examples 1 and 2, respectively, to a desired thickness using a spin coater, followed by drying at 100° C. for three minutes. After cooling, each colored layer thus formed was exposed to ultraviolet radiation of 150 mj/cm$^2$ through a photomask with use of a high-pressure mercury lamp. The exposure was performed 20 minutes after the spin-coating. Subsequently, each substrate was immersed in an aqueous solution containing 0.05% potassium hydroxide and 0.2% sodium butylnaphthalenesulfonate for development, thus forming a yellow image having a size of 200 im×50 im. Each image thus formed had superior sharpness with no undissolved matter left in a non-pixel portion on any one of the substrates. Further, it was possible to form a color filter having high uniformity, low surface coarseness and high coloring power.

Comparative Example 2

An image was formed according to Example 3 except that the photosensitive coloring composition obtained in Comparative Example 1 was used instead of the photosensitive coloring composition used in Example 3 and a time period of 20 minutes was provided between the spin-coating and the exposure. The image thus formed had a non-uniform surface in a crazed state, high surface coarseness and rough peripheral edges, and had significantly inferior sharpness.

Example 5

An image was formed according to Example 3 except that the photosensitive coloring composition obtained by allowing the photosensitive coloring composition obtained in Example 1 to stand for 8 days at room temperature was used instead of the photosensitive coloring composition used in Example 3. The image thus formed had superior sharpness. Further, it was possible to form a color filter having high uniformity, low surface coarseness and high coloring power.

Example 6

An image was formed according to Example 3 except that the photosensitive coloring composition obtained by allowing the photosensitive coloring composition obtained in Example 2 to stand for 8 days at room temperature was used instead of the photosensitive coloring composition used in Example 3. The image thus formed had superior sharpness. Further, it was possible to form a color filter having high uniformity, low surface coarseness and high coloring power.

Comparative Example 3

An image was formed according to Example 3 except that the photosensitive coloring composition obtained by allowing the photosensitive coloring composition obtained in Comparative example 1 to stand for 8 days at room temperature was used instead of the photosensitive coloring composition used in Example 3. The image thus formed had a non-uniform surface in a crazed state, high surface coarseness and rough peripheral edges, and had significantly inferior sharpness.

The photosensitive coloring composition according to the present invention is excellent in fluidity, anti-agglomeration property, anti-crystallization property, coloring power and the like. With the photosensitive coloring composition, images having superior sharpness when developed with an aqueous alkaline solution can be formed, and color filters having high uniformity, low surface coarseness and high coloring power, as well as liquid crystal display panels can be obtained steadily.

What is claimed is:

1. A photosensitive coloring composition comprising C.I. pigment yellow 150 which yields an extract in an amount of 1% by weight or less when subjected to extraction with tetrahydrofuran, other pigments, a solvent, a (meth)acrylic resin, a polyfunctional monomer, and a photopolymerization initiator.

2. The composition according to claim 1 wherein the (meth)acrylic resin has polymerization units derived from benzyl (meth)acrylate (a) and (meth)acrylic acid (B), and the molar ratio (a):(B) of the monomers is 50 to 90:10 to 50.

3. The composition according to claim 1 wherein the weight ratio of acrylic resin/pigment is about 0.1 to 16.

4. The composition according to claim 1 wherein the total content of the C.I. pigment yellow 150 and other pigments is 5% to 80% by weight relative to the total amount of solid contents.

5. The composition according to claim 1 wherein the amount of the extract extracted with THF from the other pigments is 1% by weight or less.

6. The composition according to claim 1 wherein the polystyrene-converted molecular weight of the (meth)acrylic resin is 5,000 to 300,000.

7. A color filter formed from the photosensitive coloring composition according to claim 1.

8. A liquid crystal display panel comprising the color filter according to claim 7.

9. A pigment-dispersed composition comprising C.I. pigment yellow 150 which yields an extract in an amount of 1% by weight or less when subjected to extraction with tetrahydrofuran, other pigments, and a solvent.

* * * * *